United States Patent
Jahreis

[11] Patent Number: 5,959,748
[45] Date of Patent: Sep. 28, 1999

[54] METHOD FOR OPERATING A MULTISTAGE NXN SPACE DIVISION SWITCHING ARRANGEMENT

[75] Inventor: Oliver Jahreis, München, Germany

[73] Assignee: Siemens Aktiengesellschaft, Munich, Germany

[21] Appl. No.: 08/860,707

[22] PCT Filed: Jan. 1, 1996

[86] PCT No.: PCT/DE96/00001

§ 371 Date: Jul. 22, 1997

§ 102(e) Date: Jul. 22, 1997

[87] PCT Pub. No.: WO96/23389

PCT Pub. Date: Aug. 1, 1996

[30] Foreign Application Priority Data

Jan. 27, 1995 [DE] Germany .......................... 195 02 547

[51] Int. Cl.[6] .................................................. H04J 14/00
[52] U.S. Cl. .......................................... 359/117; 359/128
[58] Field of Search .................................. 359/117, 124, 359/128, 110; 370/380; 385/16

[56] References Cited

U.S. PATENT DOCUMENTS

| | | | |
|---|---|---|---|
| 5,002,354 | 3/1991 | Koai | 350/96.14 |
| 5,457,556 | 10/1995 | Shiragaki | 359/117 |
| 5,623,356 | 4/1997 | Kaminow et al. | 359/117 |

FOREIGN PATENT DOCUMENTS

| | | |
|---|---|---|
| 0 282 268 A1 | 9/1988 | European Pat. Off. . |
| 0 353 871 A1 | 2/1990 | European Pat. Off. . |
| 26 26 417 A1 | 12/1976 | Germany . |
| WO 96/08932 | 3/1996 | WIPO . |

OTHER PUBLICATIONS

Patent Abstracts of Japan, JP62–020493, vol. 11, No. 195 (E–518), Jan. 29, 1987, Suzuki Shuji, Control System for Optical Switch Network.

Patent Abstracts of Japan, JP61–194408, vol. 11, No. 19 (P–537) Aug. 28, 1986, Habara Takashi, Optical Switch Matrix.

(List continued on next page.)

*Primary Examiner*—Kinfe-Michael Negash
*Attorney, Agent, or Firm*—Hill & Simpson

[57] ABSTRACT

Method for operating a multistage NxN space division switching arrangement

In a multistage integrated-optical NxN space division switching arrangement with $N=2^n$ (where n=1, 2, 3, . . . ) input pyramids, which each follow a space division switching arrangement input, of integrated-optical 1x2 switches which may have two switched-on states, and $N=2^n$ output pyramids, which each precede a space division switching arrangement output, of integrated-optical 1x2 switches which may have two switched-on states, and having a (perfect shuffle) link network of $N^2$ links running between input and output pyramids, in which network light at one and the same wavelength always occurs at each input of the NxN space division switching arrangement, the wavelength of the individual inputs being repeated at intervals of in each case $M=2^m$ (where m=1, 2, . . . , n−1) inputs,—when in each case two links are directly connected to each of the respective $2^{n-1}$ 1x2 switches on the pyramid base side of n-stage pyramids of 1x2 switches—then, to form a connecting path running from an i-th input pyramid to an output pyramid, in each case in a crosstalk path running from a j-th (where $|i-j|=v \cdot 2^m$; v=1, 2, . . . ) input pyramid to the said output pyramid, the maximum of m 1x2 switches in the input pyramid which are not at the same time included in a connecting path and are connected between the pyramid input and the pyramid output which is connected to the output pyramid, and always m 1x2 switches in the output pyramid which are not at the same time included in a connecting path and are connected between the pyramid output the pyramid input which is connected to the input pyramid, are switched to the switched-on position in each case pointing away from the crosstalk path.

2 Claims, 2 Drawing Sheets

OTHER PUBLICATIONS

Applied Optics, vol. 14, No. 11, Nov. 1975, New York, R.A. Soref et al, Crosstalk Reduction in Optical Switching, pp. 2559–2560.

ICC Conference Record, Geneva, 1993, vol. 3/3, Communications—Technology that Unites Nations, Ken–ichi Sato et al, Optical Path Layer Technologies to Enhance B–ISDN Performance, pp. 1300–1307.

ntz 46 (1993) vol. 46, Ernst–Juergen Bachus et al, Optische Frequenzmultipextechnik, pp. 16–20.

Electronics Letters, vol. 30, No. 3, Feb. 3, 1994, B. Acklin et al, Novel Optical Switches Based on Carrier Injection in Three and Five Waveguide Couplers: TIC and SIC, pp. 217–218.

METHOD FOR OPERATING A MULTISTAGE NXN SPACE DIVISION SWITCHING ARRANGEMENT

BACKGROUND OF THE INVENTION

Modern, futuristic optical trunk traffic networks have to satisfy stringent requirements in terms of capacity, flexibility, reliability and transparency. These requirements for a transport network are optimally satisfied when data are transmitted and switched using the optical frequency division multiplex method. In the case of the optical frequency-division multiplex method (wavelength-division multiplex—WDM), a plurality of transmission channels are combined on one fiber and are separated from one another by their optical carrier frequencies (wavelengths) which differ from one another by several 100 GHz. The maximum number of possible channels in this case limited by the amplification bandwidth of optical fiber amplifiers.

Optical cross-connects (OCC) are provided for semi-permanent and blocking-free coupling of optical channels. Such optical cross-connects, as a rule, have both a frequency switching stage and a space division switching stage.

ICC'93 Conf.Rec. Vol.3/3, 1300 . . . 1307, FIG. 10, in this context discloses a WDM switching arrangement having wavelength demultiplexers on the input side which in each case split the incoming optical signal on the associated input fiber on the basis of wavelengths, a downstream space division switching arrangement (space switch), downstream adjustable wavelength converters which convert the respectively incoming wavelength to the respective outgoing wavelength, and wavelength multipliers on the output side which combine the wavelengths supplied to them.

ntz 46(1993)1, pages 16 . . . 21, FIGS. 13 and 14 discloses WDM switching arrangements in which wavelength demultiplexers (1/N in FIG. 13; unnamed in FIG. 14) are likewise provided on the input side, wavelength multiplexers (N/1 in FIG. 13; unnamed in FIG. 14) are provided on the output side, and wavelength converters (frequency stages in FIG. 13; filter and frequency converters in FIG. 14) are provided for wavelength conversion to the respective outgoing wavelength, with an intermediate space division switching arrangement (space stage in FIG. 13; fiber switch in FIG. 14) is also provided.

In such arrangements of optical (de)multiplixers and space division switching arrangement the same optical frequency (wavelength) may possibly always be applied to each input of the space division switching arrangement, in which case, with the same frequency allocation of the individual optical waveguides in each case to the same frequency division multiplex of M optical carrier frequencies, the optical frequency of an input of the space division switching arrangement is repeated every M inputs.

The object of the space division switching arrangement is to connect the inputs to the outputs without any blocking, that is to say to make it possible to switch a path through the space division switching arrangement, in every load case, between any given free input and any given free output.

One possible architecture for a space division switching arrangement having N inputs and N outputs is a combination of in each case N 1xN tree structures at the N inputs and N outputs with a link network (shuffle network) between the tree structures of the inputs and outputs; in this case, each tree structure can be formed by a pyramid of 1x2 switches (see, for example, JP-A-61194408, JP-A-62020493).

Technical implementations of optical 1x2 switches in fact have only a limited amount of crosstalk attenuation: some of the respective signal also passes to that output which is not currently selected, which has the effect of crosstalk between one signal path and another signal path in the space division switching arrangement. The crosstalk attenuation of currently available optical switches based on semiconductors is still unsatisfactory, and a space division switching arrangement which is formed from such switches therefore does not per se satisfy the system requirements. In this case, crosstalk between two channels at the same optical frequency is particularly critical while, in the case of a crosstalk signal at a different optical frequency, additional crosstalk attenuation can be achieved to a sufficient extent by means of filters in the multiplexer stage downstream of the space division switching arrangement outputs.

For comparatively enhanced crosstalk suppression, it is possible (according to DE-A1-4 432 728), in an optical 1xN switching matrix with a tree structure and having an optical input/output and a number N of optical outputs/inputs, comprising an optical waveguide structure which connects the input/output with each output/input and comprises optical waveguides which branch like a tree at junction points from the input/output in the direction of outputs/inputs, and in each case one optical changeover switch per junction point for selectively changing over between waveguides which branch off from these junction points, to assign to the outputs/inputs in each case one optical gate switch for selectively optically releasing and blocking this output/input as a function of a switching state of the changeover switch at a junction point from which a branching waveguide is connected to this output/input, in an optical NxN switching matrix having a tree structure with a number N of optical inputs and N optical outputs, comprising two matrix rows of in each case N optical 1xN switching matrices, each 1xN switching matrix having in each case one optical input/output and in each case N optical outputs/inputs, and an optical switching network having two rows of connections, each comprising NxN optical connections, each of which is used as an optical input and/or output, it being possible to connect each connection in a row of connections optically to each connection in the other row of connections, the total of NxN optical outputs/inputs of the N optical 1xN switching matrices in each matrix row are connected in parallel to the NxN optical connections of in each case one row of connections, and the total of N optical inputs/outputs of the N optical 1xN switching matrices in each matrix row form the N inputs and/or N outputs of the NxN switching matrix, the optical 1xN switching matrices may be 1xN switching matrices designed in the indicated manner.

In this case, the changeover switches and gate switches are expediently 1x2 switches with two switched-on states, in which the light is passed essentially via in each case one of the two switching paths, the respective switched-on path, and a greatly attenuated element of the light, at most, is inadvertently coupled over to the respective other switching path, and with a third state, in which the light experiences the same attenuation on both switching paths and, to this extent, signals are not "switched-through" on either of the two paths. Such 1x2 switches having more than two switching states are, for example (known from B. Acklin, M.

Schienle, B. Weiss, L. Stoll, G. Müller "Novel optical switches based on carrier injection in three and five waveguide couplers: TIC and SIC", Electronics Letters, 30(1994)3, 217) TIC switches or else other digital optical switches with a third switching state in which the light experiences the same attenuation on both switching paths. In this case, in each 1xN switching matrix, only those changeover switches and that gate switch via which the intended light path passes are then switched to the corresponding switched-on state and, in addition, the further gate switch which is connected to the changeover switch that is connected to this gate switch is switched to a switching state which leads to an optical sink; all the other changeover switches and gate switches are in the third switching state (DE-A1-4 432 728).

In order to suppress k-th order crosstalk in a multistage optical NxN space division switching arrangement with input-specific optical splitters and output-specific output pyramids of 1x2 switches which may have two switched-on states, (according to EP-A1-0 353 871) these switch pyramids, which each have N inputs, of $\log_2$ N pyramid stages which are intrinsically sufficient for N inputs may also be extended to (k+$\log_2$ N) pyramid stages, only N pyramid inputs being connected, however, to corresponding outputs of N optical splitters and the other pyramid inputs remaining unconnected, and it being possible to switch all 1x2 switches only jointly in each pyramid stage; quite a number (but not all in any case) of the 1x2 switches which are not included in a connecting path may in this case be switched to a switching state of increased crosstalk attenuation.

In fact, in addition to increased crosstalk attenuation, the insertion of additional switching stages into the tree structure also results in an increased insertion loss. However, in addition to the crosstalk attenuation, the insertion loss is a second critical variable of a space division switching arrangement, which it is necessary to optimize.

The invention now indicates a different means of achieving increased crosstalk attenuation, to be precise without also having to accept increased insertion loss at the same time.

SUMMARY OF THE INVENTION

The invention relates to a method for operating a (2($\log_2$ N))-stage NxN space division switching arrangement having N=$2^n$ (where n=1, 2, 3, . . . ) ($\log_2$ N)-stage input pyramids, which each follow a space division switching arrangement input of 1x2 switches which may have two switched-on states, and N=$2^n$ ($\log_2$ N)-stage output pyramids which each precede a space division switching arrangement output of 1x2 switches which may have two switched-on states, as well as a perfect shuffle link network, which runs between input and output pyramids, of $N^2$ links, in which any channel crosstalk between inputs which are mutually offset in each case by M=$2^n$ (where m=1, 2, . . . n−1) inputs or a multiple thereof is critical, in particular in an optical switching arrangement having wavelength demultiplexers on the input side which each split the WDM signal arriving on an associated input fiber on the basis of wavelengths, following which, an NxN space division switching arrangement which is formed by pyramids of integrated-optical 1x2 switches which may have two switched-on states, in which arrangement light at one and the same wavelength (and thus the optical carrier frequency), which is repeated at intervals of in each case M=$2^m$ (where m=1, 2, . . . n−1) inputs or it occurs at each input, and which, in an optical space division wavelength (R-W) switching arrangement, can be followed by adjustable wavelength converters which convert the respective incoming wavelength to a fixed outgoing wavelength, and wavelength multiplexers on the output side which in each case combine the signals at different wavelengths supplied to them to form a WDM signal;

this method is characterized according to the invention in that—when in each case two links are directly connected to each of the respective $2^{n-1}$ 3x2 switches on the pyramid base side of n-stage pyramids of 1x2 switches to form a connecting path running from an i-th input pyramid to an output pyramid, which connecting path extends from the input of the input pyramid to the output of the output pyramid, via the n 1x2 switches which connect this input to the input pyramid output, the link which connects this input pyramid output to the corresponding output pyramid input and the n 1x2 switches which connect this output pyramid input to the said output of the output pyramid, in a crosstalk path running from a j-th (where $|i-j|=v\cdot 2^m$; v=1, 2, . . . ) input pyramid to the said output pyramid, which crosstalk path extends from the input of the input pyramid to the output of the output pyramid, via the n 1x2 switches which connect this input to the input pyramid output, the link which connects the input pyramid output to the corresponding output pyramid input and the n 1x2 switches which connect this output pyramid input to the output of the output pyramid, all the 1x2 switches which are not at the same included in a connecting path are switched to the switching state of maximum crosstalk attenuation;

in a further refinement of the invention, the maximum of m 1x2 switches which are not at the same time included in a connecting path and are located between the pyramid input and the pyramid output which is connected to the output pyramid can be connected in the input pyramid, and the m 1x2 switches which are not at the same time included in a connecting path and are connected between the pyramid output and the pyramid input which is connected to the input pyramid, these switches being in the switched-on position in each case pointing away from the crosstalk path.

The invention, which avoids extending switch pyramids to more than $\log_2$ N pyramid stages and in them, preferably, additional 1x2 switches which change to the switching state of increased crosstalk attenuation, deliberately uses the fundamentally existing capability of changing unused switches to a position in which undesirable crosstalk paths are optimally attenuated to provide the advantage of increased crosstalk attenuation in a defined crosstalk path with respect to a defined wanted connecting path, in that it makes it possible to suppress crosstalk originating from inputs which are at a distance of $v\cdot 2^m$ (where m=1, 2, . . . , n−1; v=1, 2, . . . ) from the respective wanted signal input, to be precise without this also incurring any increased insertion loss associated with insertion of additional 1x2 switches. At the same time, it is not essential to the invention for the 1x2 switches which have two switched-on states also to have the capability of a third switching state as well.

It should be mentioned at this point that it is known (from EP-A1-0 282 268) for blind coupling points, for equalizing light intensities, to be provided in specific coupling paths in order to reduce crosstalk effects in an optical space division switching arrangement constructed using input and output pyramids; no more detailed points of contact with the present invention are stated.

BRIEF DESCRIPTION OF THE DRAWINGS

The features of the present invention which are believed to be novel, are set forth with particularity in the appended claims, The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
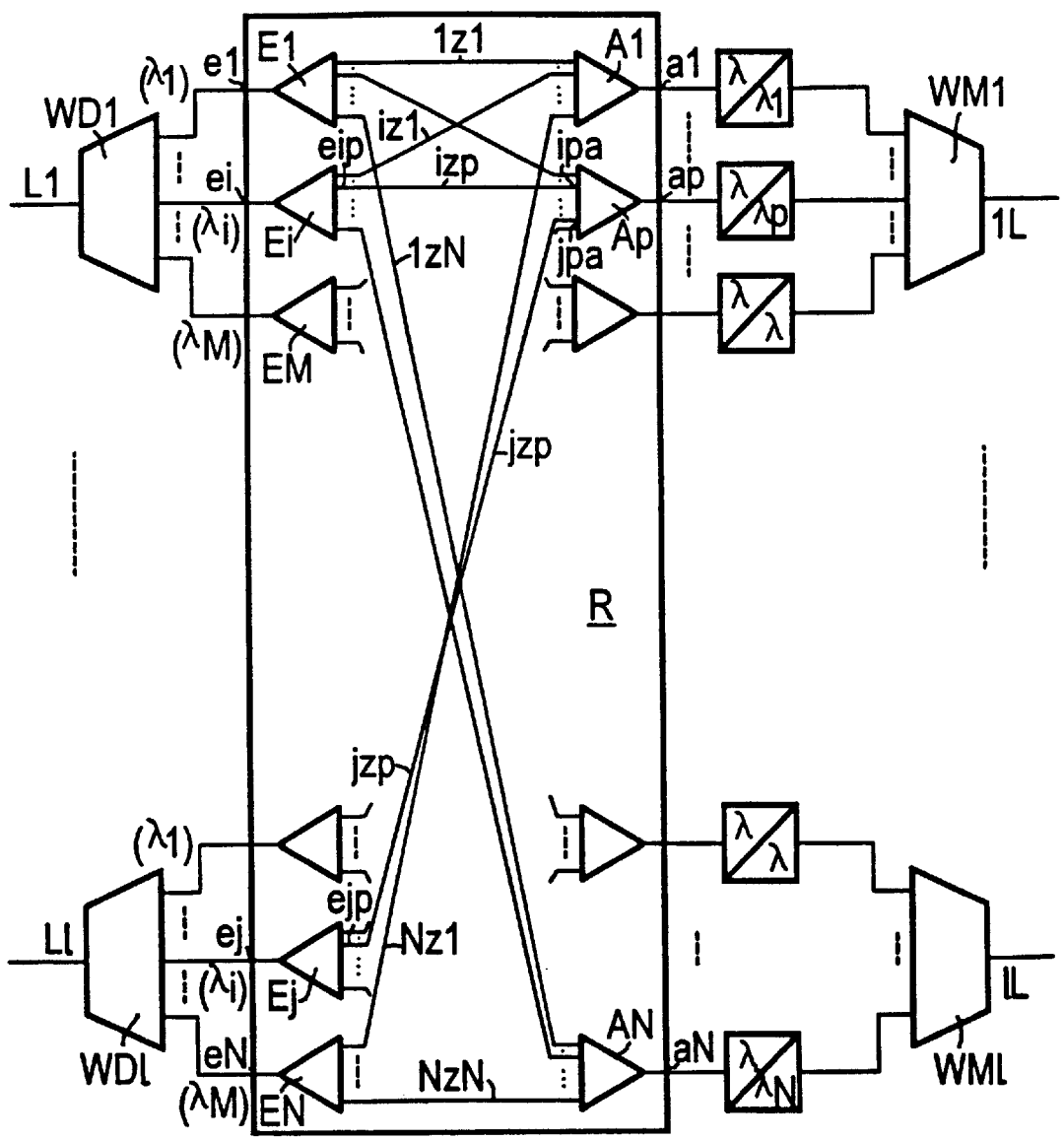
FIG. 1 shows an R-W switching arrangement schematically.

In the drawing, FIG. 1 shows schematically, to an extent required for understanding of the invention, an exemplary embodiment of an optical space division wavelength (R-W) switching arrangement connected between l input fibers L1, . . . , L1 and l output fibers 1L, . . . , 1L, it being possible to combine M wavelengths $\lambda_1, \ldots, \lambda_M$ in each case on an input fiber and likewise M wavelengths $\lambda_1, \ldots, \lambda_M$ on an input fiber in each case, using the wavelength division multiplex method.

The l input fibers L1, . . . , L1 each lead to a wavelength demultiplexer WD1, . . . , WD1, which splits the optical signal arriving on the respectively associated input fibers L1, . . . , L1 on the basis of wavelengths. The N inputs e1, . . . , eN of an integrated-optical NxN space division switching arrangement R are connected to the total maximum number of $N=2^n$ (where n=1, 2, 3, . . . ) outputs of the wavelength demultiplexers WD1, . . . , WD1, so that light at one and the same wavelength (or optical carrier frequency) always occurs at each input of the NxN space division switching arrangement R, the wavelength (or the optical carrier frequency) of the individual inputs being repeated at intervals of in each case $M=2^m$ inputs (where m=1, 2, . . . , n-1).

The space division switching arrangement R has $N=2^n$ input pyramids E1, . . . , EN, which each follow a space division switching arrangement input e1, . . . , eN, of integrated-optical 1x2 switches which may have two switched-on states, $N=2^n$ output pyramids A1, . . . , AN which each precede a space division switching arrangement output a1, . . . , aN of integrated-optical 1x2 switches which may have two switched-on states, as well as a perfect shuffle link network of $N^2$ links lz1, . . . , 1zN, . . . , Nz1, . . . , NzN, by means of which each of the N input pyramids is connected to each of the N output pyramids, which perfect shuffle link network runs symmetrically between those outputs of the input pyramids E1, . . . , EM, . . . , EN which form the input pyramid bases and those inputs of the output pyramids which form the output pyramid bases.

In the exemplary embodiment sketched in FIG. 1, the outputs a1, . . . , aN of the space division switching arrangement R have connected to them adjustable wavelength converters $\lambda/\lambda_1, \ldots, \lambda/\lambda_1, \ldots, \lambda/\lambda_N$, in which the respective incoming signal is converted to a respective fixed defined (output) wavelength, irrespective of the previous (input) wavelength. It should be mentioned that such wavelength converters are omitted if conversion of the wavelengths is not envisaged. The wavelength converters $\lambda/\lambda_1, \ldots, \lambda/\lambda_N$ or, in the event of their omission, the corresponding outputs of the space division switching arrangement R, are combined on the output side by wavelength multiplexers WM1, . . . , WM1, which in each case combine the signals supplied to them at different wavelengths to form a WDM signal and lead on the output side to the output fibers 1L, . . . , lL.

The invention is now based on the idea that in the space division switching arrangement R—which is formed with in each case $N=2^n$ inputs and outputs, input pyramids of 1x2 switches in each case following a space division switching arrangement input, output pyramids of 1x2 switches in each case preceding a space division switching arrangement output, and a perfect shuffle link network of $N^2$ links, by means of which each of the N input pyramids are connected to each of the N output pyramids, running symmetrically between those outputs of the input pyramids which form the input pyramid bases and those inputs of the output pyramids which form the output pyramid bases—the only crosstalk which is critical is that between inputs whose positions differ by $M=2^m$ (where $1 \leq m \leq n-1$), or a multiple thereof. In the exemplary embodiment according to FIG. 1, this criticality results from the fact that signals at the same optical carrier frequency occur just at those inputs which differ by $M=2^m$ in the numerical sequence; for example, light at the wavelength $\lambda_i$ may occur at each of the inputs ei and ej of the space division switching arrangement R according to FIG. 1.

A connecting path which runs from an i-th input pyramid (Ei in FIG. 1) to an output pyramid, for example the output pyramid Ap (in FIG. 1) and extends from the input ei of the input pyramid Ei to the output Ap via this input pyramid, the link izp connecting its output eip to the corresponding output pyramid input ipa, and the output pyramid Ap, has running to it a critical crosstalk path, for example, of a j-th (where $|i-j|=v \cdot 2^m$; v=1, 2, . . . ) input pyramid (Ej in FIG. 1) to the said output pyramid Ap, which path extends from the input ej of the input pyramid Ej to the output ap of said output pyramid Ap via this input pyramid, the link jzp connecting its output ejp to the corresponding output pyramid input jpa, and said output pyramid Ap.

Figure 2:
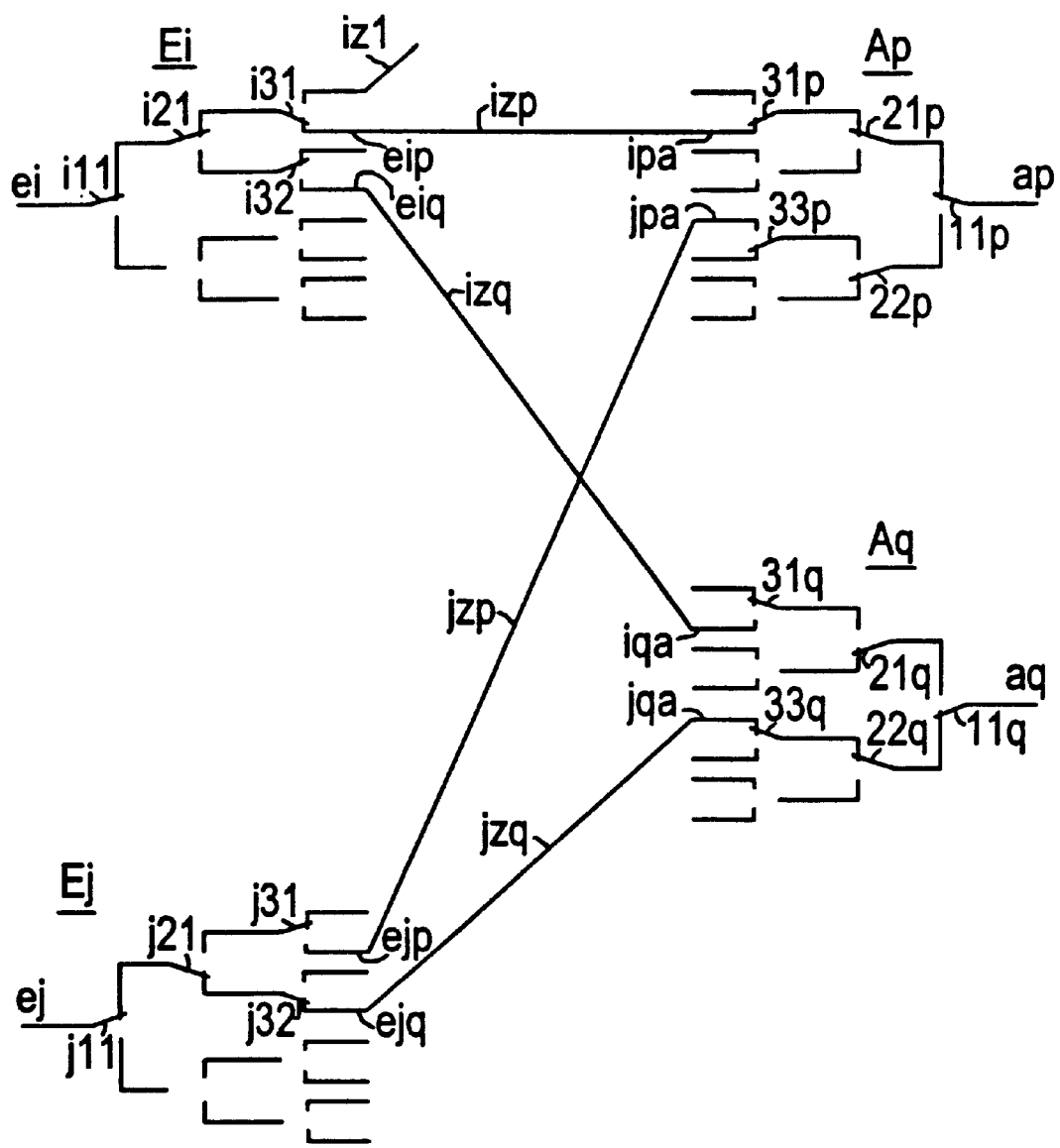
FIG. 2 shows circuitry details relating to it.

The connecting path and crosstalk path can be seen even more clearly in the drawing in FIG. 2, in which the two input pyramids Ei and Ej and the output pyramid. Ap (see also FIG. 1) and a further output pyramid Aq are illustrated in more detail. Each pyramid is constructed with n stages of integrated-optical 1x2 switches which may have two switched-on states, it being possible, as is indicated for the switch i31 of the input pyramid Ei and for the switch 31p of the output pyramid Ap, for in each case two links (iz1, izp; 1zp,izp) to be connected directly to each of the respective $2^{n-1}$ 1x2 switches (i31; 31p) on the pyramid-base side of the n-stage pyramids (Ei; Ap) of 1x2 switches.

The connecting path, already considered with respect to FIG. 1, from the i-th input pyramid Ei to the output pyramid Ap runs, according to FIG. 2, from the input ei of the input pyramid Ei via n 1x2 switches i11, i21, i31, which connect this input ei to the corresponding input pyramid out eip, further via the link izp which connects the input pyramid output eip to the corresponding output pyramid input ipa, and finally via n 1x2 switches 31p, 21p, 11p which connect this output pyramid input ipa to the output ap of the output pyramid Ap, to this output ap.

Another connecting path may run from the input pyramid Ej to the output pyramid Aq, to be precise from the input ej of the input pyramid Ej via n 1x2 switches j11, j21, J32 which connect this input ej to the corresponding input pyramid output ejq, further via the link jzq which connects the input pyramid output ejq to the corresponding output pyramid input jqa, and finally via n 1x2 switches 33q, 22q, 11q, which connect this output pyramid input iqa to the output aq of the output pyramid Aq, to this output aq.

The crosstalk path, previously considered with reference to FIG. 1, from the j-th input pyramid Ej to the output pyramid Ap runs, according to FIG. 2, from the input ej of the input pyramid Ej via n 1x2 switches j11, j21, j31 which connect this input ej to the corresponding input pyramid output ejp, further via the link jzp which connects the input pyramid output ejp to the corresponding output pyramid input jpa, and finally via n 1x2 switches 33p, 22p, 11p which connect this output pyramid input jpa to the output ap of the output pyramid Ap, to this output ap.

In this crosstalk path, all the 1x2 switches which are not at the same time included in a connecting path are switched to the switching state of maximum crosstalk attenuation. This is done in the following manner in the exemplary embodiment according to FIG. 2 with 1x2 switches which have just two switched-on states:

In the input pyramid Ej, the 1x2 switches which are not at the same time included in a connecting path and are connected between the pyramid input ej and the input pyramid output ejp connected to the output pyramid Ap are switched to the switched-on position in each case pointing away from the crosstalk path. In the exemplary embodiment under consideration, this is the switch j31, while the switches j11 and j21, which are also in the crosstalk path under consideration, are at the same time located in the other connecting path ej-ejq-jzq-jqa-aq which has already been considered above and by which their switched-on position is determined; in general, depending on the connections which are in each case switched through, between 0 and m 1x2 switches which are connected between the pyramid input ej and the input pyramid output ejp connected to the output pyramid Ap can be switched to the switched-on position in each case pointing away from the crosstalk path.

In the output pyramid Ap, on the other hand, m 1x2 switches which are not at the same time included in a connecting path and are connected between the pyramid output ap and the pyramid input jpa which is connected to the input pyramid Ej, in the example the switches 33p, 22p, are switched to the switched-on position in each case pointing away from the crosstalk path.

A corresponding situation also applies to the crosstalk path existing to the other connecting paths ej-ejq-jzq-jqa-aq which has already been considered above, from the i-th input pyramid Ei to the output pyramid Aq. According to FIG. 2, this crosstalk path runs from the input ei of the input pyramid Ei to the output aq of the output pyramid Aq via n 1x2 switches i11, i21, i32 which connect this input ei to the corresponding input pyramid output eiq, further via the link izq which connects the input pyramid output eiq to the corresponding output pyramid input iqa, and further via n 1x2 switches 31q, 21q, 11q which connect this output pyramid input iqa to the said output aq of the output pyramid Aq.

In addition, in this crosstalk path, all the 1x2 switches which are not at the same time included in a connecting path are switched to the switching state of maximum crosstalk attenuation:

In the input pyramid Ei, the 1x2 switches which are not at the same time included in a connecting path and are connected between the pyramid input ei and the input pyramid output eiq connected to the output pyramid Aq are switched to the switched-on position in each case pointing away from the crosstalk path. In the exemplary embodiment under consideration, this is the switch i32, while the switches i11 and i21 which are also connected in the crosstalk path under consideration are at the same time connected in the other connecting path ei-eip-izp-ipa-ap, which was considered first and by means of which their switched-on position is determined.

In the output pyramid Aq, once again, m 1x2 switches which are not at the same time included in a connecting path and are connected between the pyramid output aq and the pyramid input iqa connected to the input pyramid Ei, in the example the switches 31q, 21q, are always switched to the switched-on position in each case pointing away from the crosstalk path.

In comparison with a corresponding space division switching arrangement having, in the manner mentioned initially, 1x2 switches with two switched-on states and which may have a third state, in which arrangement all the switches which are not currently connected in a connecting path are in each case in the third switching state, the crosstalk attenuation for any given connecting path in the space division switching arrangement operated according to the invention is improved at least by m·(s−u) [dB] and at most by 2m·(s−u) [dB], s being the crosstalk attenuation of a 1x2 switch in the (respectively other) switched-on state, and u being the attenuation of a 1x2 switch in the third switching state. If the crosstalk attenuation of a 1x2 switch is assumed to be s=20 dB, and the crosstalk attenuation (insertion loss) in the third switching state is assumed to be u=4 dB, the invention thus provides, in the exemplary embodiment under consideration via n=3 and m=2, an improvement in the crosstalk attenuation for any given signal path between the input and output of a minimum of 32 dB and a maximum of 64 dB.

Finally, it should be mentioned that the invention in the above text has admittedly been described in the context of an optical switching arrangement with wavelength demultiplexers on the input side, a downstream NxN space division switching arrangement with pyramids of integrated-optical 1x2 switches, possibly downstream wavelength converters and wavelength multiplexers on the output side; however, the invention is not limited to this but can also be used in an entirely general form in the case of a multistage NxN space division switching arrangement having $N=2^n$ (where n=1, 2, 3, . . . ) input pyramids, which are in each. case downstream of a space division switching arrangement input, of 1x2 switches which may have two switched-on states, and $N=2^n$ output pyramids, which in each case precede a space division switching arrangement output, of 1x2 switches which may have two switched-on states, as well as a (perfect shuffle) link network of $N^2$ links running between the input and output pyramids, in which channel crosstalk is critical between inputs mutually offset by in each case $M=2^m$ (where m=1, 2, . . . , n−1) inputs or a multiple-thereof; the above explanations relating to FIG. 2 apply to this in the same manner.

The invention is not limited to the particular details of the method depicted and other modifications and applications are contemplated. Certain other changes may be made in the above described method without departing from the true spirit and scope of the invention herein involved. It is intended, therefore, that the subject metter in the above depiction shall be interpreted as illustrative and not in a limiting sense.

What is claimed is:

1. A method for operating a NxN space division switching arrangement where N is a whole number, said switching arrangement having $2 \cdot \log_2 N$ stages, comprising the steps of:

providing $N=2^n \cdot \log_2 N$, where n=1, 2, 3, . . . , input pyramids, each following a space division switching arrangement input, of 1·2 switches which may have two switched-on states;

providing $N=2^n \cdot \log_2 N$, where n=1, 2, 3, . . . , output pyramids, each preceding a space division switching arrangement output, of 1x2 switches which may have two switched-on states;

providing a link network, which runs between input and output pyramids, of $N^2$ links, wherein channel crosstalk between inputs which are mutually offset by $M=2^m$, where $m=1, 2, \ldots, n-1$, inputs or a multiple thereof, is taken into consideration;

providing wavelength demultiplexers on an input side of the arrangement which each split a WDM signal arriving on an associated input fiber based on wavelengths;

providing a downstream NxN space division switching arrangement which is formed by pyramids of integrated-optical 1x2 switches which may have two switched-on states, in which arrangement light at a common wavelength, which is repeated at intervals of in each case $M=2^m$—where $m=1, 2, \ldots, n-1$—inputs, always occurs at each input of the arrangement, and which, in an optical space-division wavelength switching arrangement, is followable by adjustable wavelength converters which convert a respective incoming wavelength to a fixed outgoing wavelength;

providing wavelength multiplexers on an output side of the arrangement, each of which combines signals at different wavelengths supplied thereto to form a WDM signal;

connecting two links to each of respective $2^{n-1}$ 1x2 switches on a pyramid base side of n-stage pyramids of 1x2 switches, which connecting path extends from the input of the input pyramid to the output of the output pyramid, via the n 1x2 switches which connect this input to the output of the input pyramid;

switching the link which connects the input pyramid output to the corresponding output pyramid input and the n 1x2 switches which connect this output pyramid input to the output of the output pyramid, in a crosstalk path running from a j-th where $|I-j|=v \cdot 2^m$; $v=1, 2, \ldots$, input pyramid to the output pyramid, which crosstalk path extends from the input of the input pyramid to the output of the output pyramid, via the n 1x2 switches which connect this input to the output of the input pyramid;

switching the link which connects the input pyramid output to the corresponding input of the output pyramid and the n 1x2 switches which connect this input of the output pyramid to the output of the output pyramid; and switching all 1x2 switches which are not presently included in a connecting path to a switching state of maximum crosstalk attenuation.

2. The method as claimed in claim 1, wherein a maximum of m 1x2 switches which are not presently included in a connecting path and which are located between the pyramid input and the pyramid output which is connected to the output pyramid are connected in the input pyramid, and wherein each of m 1x2 switches, which are not included in a connecting path and which are connected between the pyramid output and the pyramid input which is connected to the input pyramid, being in a switched-on position pointing away from the crosstalk path.

* * * * *